United States Patent
Rantala

(10) Patent No.: US 9,468,874 B2
(45) Date of Patent: Oct. 18, 2016

(54) NECK ELEMENT OF DISC FILTER SECTOR AND DISC FILTER SECTOR

(71) Applicant: Valmet Technologies Oy, Espoo (FI)

(72) Inventor: Anssi Rantala, Lempaala (FI)

(73) Assignee: VALMET TECHNOLOGIES OY, Espoo (FI)

( * ) Notice: Subject to any disclaimer, the term of this patent is extended or adjusted under 35 U.S.C. 154(b) by 0 days.

(21) Appl. No.: 14/774,955

(22) PCT Filed: Mar. 27, 2014

(86) PCT No.: PCT/FI2014/050221
§ 371 (c)(1),
(2) Date: Sep. 11, 2015

(87) PCT Pub. No.: WO2014/154949
PCT Pub. Date: Oct. 2, 2014

(65) Prior Publication Data
US 2016/0038857 A1    Feb. 11, 2016

(30) Foreign Application Priority Data
Mar. 28, 2013 (FI) .................................. 20135303

(51) Int. Cl.
*B01D 33/21* (2006.01)
*B01D 33/23* (2006.01)

(52) U.S. Cl.
CPC .............. *B01D 33/23* (2013.01); *B01D 33/21* (2013.01)

(58) Field of Classification Search
None
See application file for complete search history.

(56) References Cited

U.S. PATENT DOCUMENTS

| 3,471,026 | A | * | 10/1969 | Riker | ................. | B01D 33/23 210/327 |
| 3,971,722 | A | * | 7/1976 | Radford | ................. | B01D 33/23 210/486 |
| 4,203,846 | A | * | 5/1980 | Barthelemy | ............ | B01D 33/23 210/331 |
| 2011/0203989 | A1 | | 8/2011 | Rantala | | |

FOREIGN PATENT DOCUMENTS

| AU | 1969-63064 A | 5/1971 |
| FI | 120185 B | 7/2009 |
| FI | 121136 B | 7/2010 |

OTHER PUBLICATIONS

International Searching Authority (ISA), International Search Report and Written Opinion for International Application No. PCT/FI2014/050221, Jun. 13, 2014, 10 pages, National Board of Patents and Registration of Finland, Finland.

(Continued)

*Primary Examiner* — Benjamin Kurtz
(74) *Attorney, Agent, or Firm* — Alston & Bird LLP

(57) ABSTRACT

A neck element of a disc filter sector and a disc filter sector. A sector (5) is provided with a blade part (11) having a filtering surface and a neck part (12) coupling the blade part to a disc filter (1). The neck part has an inner space through which liquid runs from the sector. The inner space of the neck part is provided with at least one support element (18) to prevent opposite flanks (19) defining the neck part from moving in relation to one another. The sector may comprise a separate neck element (20) that may be coupled to the blade part. In that case the neck element is provided with at least one inner support element.

9 Claims, 4 Drawing Sheets

(56) References Cited

OTHER PUBLICATIONS

International Preliminary Examining Authority, International Preliminary Report on Patentability, including Applicant's Jan. 26, 2015 Response to ISA's Jun. 13, 2014 Written Opinion, for International Application No. PCT/FI2014/050221, Mar. 27, 2015, 14 pages, National Board of Patents and Registration of Finland, Finland.

National Board of Patents and Registration of Finland, Office Action and Search Report for Finnish Application No. 20135303, Jan. 17, 2014, 7 pages, Finland.

* cited by examiner

NECK ELEMENT OF DISC FILTER SECTOR AND DISC FILTER SECTOR

CROSS REFERENCE TO RELATED APPLICATIONS

This application is a National Stage Application, filed under 35 U.S.C. 371, of International Application No. PCT/FI2014/050221, filed Mar. 27, 2014, which claims priority to Finnish Patent Application No. 20135303, filed Mar. 28, 2013, the contents of both of which as are hereby incorporated by reference in their entirety.

BACKGROUND

The invention relates to a neck element of a disc filter sector, which may be attached to the sector in such a manner that it forms a neck part of the sector.

The invention further relates to a disc filter sector.

The field of the invention is described in closer detail in the preambles of the independent claims of the application.

In mining industry, metal refining, chemical industry and in food and drug manufacturing processes, for example, there is need for solid-liquid filtering in which liquid and solid particles are separated from a mixture comprised of solid matter and liquid. A disc filter is one of the wet filters appropriate for the purpose. A disc filter has a plurality of substantially triangular sector elements arranged side by side so that the sectors form a discoidal structure. On top of each sector, a filter bag made of filtering cloth may be arranged, which may act as the filtering element. The inside of the sector is provided with an underpressure, which enhances the filtering and transfers the filtered liquid out of the sector through a neck part of the sector. However, it has been observed that suction formed inside the sector may cause problems in filtering.

BRIEF SUMMARY

An object of the invention is to provide a novel and improved neck element of a disc filter sector and a disc filter sector.

A neck element of the invention is characterized in that inside the neck element there is at least one support element connecting the flanks of the neck element.

A disc filter sector of the invention is characterized in that the neck part is formed by a separate neck element fastened to the blade part, the neck element comprises flanks that are parallel with the flanks of the blade part (11), and inside the neck element there is at least one support element joining the flanks of the neck element.

The idea of the disclosed solution is that the neck part of the disc filter sector is provided with one or more inner support members. The support member provides support between the inner surfaces of the neck part and tends to prevent the inner surfaces from moving in relation to one another by the pressure difference acting during filtering between the outer and inner surfaces of the neck part. The inner surface of the neck part comprises opposite flank surfaces and opposite edge surfaces, of which the side surfaces are parallel with the filtering surface of the sector and have a larger surface area than the edge surfaces of the neck part. One or more support members are arranged between the flank surfaces to reinforce the structure of the flank surfaces and to prevent their deformation.

An advantage of the disclosed solution is that the support element enables to prevent throttling caused in the flow channel of the neck part by the flank surfaces approaching each other due to suction. In other words, the support element stiffens the neck part structure. Since the throttling of the flow channel can be avoided, the flow channel maintains its designed size and shape. This allows the filtered liquid to be transferred efficiently through the neck part into the filtering device. In addition, the solution allows a strong suction to be used.

Without the support, buckling may contract the flow channel most in the middle of the channel and, as a result, the flow is not uniform in the cross-sectional area of the flow channel. In that case the flow on the border areas may be emphasized. Moreover, the contracted cross-sectional flow surface are causes a rapid increase in flow rate. All of the above may increase wear on the border areas of the neck part. An advantage of the solution disclosed in this application is that the support inside the neck part prevents wear on the border areas, because the flow channel does not become inward buckled and contracted in the middle.

A further possible advantage is that the disclosed support element may prevent the neck part from expanding outward. The neck part may be subjected to outward forces when one uses what is known as a snap-blow release in which a pneumatic pulse is supplied through the neck part into the space inside the disc filter sector for detaching a solid matter cake that has built up during the filtering on the flank surfaces of the sector. As the neck part structure is alternately subjected to an underpressure and an overpressure during use, this pressure variation may cause a back-and-forth movement of the neck part flanks, which may result in fatigue damages to the structure. By stiffening the neck part with one or more support elements, the back-and-forth movement and the resulting fatigue load may be prevented. This allows the durability of the neck part to be improved and its service life to be extended.

According to an embodiment, the neck part of the sector is formed by a separate neck element fastened to the blade part. Such a neck element is often referred to as a loose neck. The neck element comprises a body with two opposite, substantially triangular flanks that are parallel with the flanks of the sector blade part, which act as filtering surfaces in the sector. Further, the neck element is provided with two opposite side edges. The neck element has a flat shape, the surface area of its flanks being bigger than the surface area of the side edges. In addition, the opposite ends of the body are provided with coupling surfaces. First coupling surfaces are provided at a first end of the body for coupling the neck element to the blade part of the disc filter sector. Second coupling surfaces are provided at a second end of the body for coupling the neck element to the disc filter. Further still, inside the neck element there is a space defined by flanks and side edges. The neck element comprises one or more support elements arranged between opposite inner surfaces in the space inside the neck element.

According to an embodiment, the neck element has a flow channel on a portion between the first coupling surfaces and the second coupling surfaces located at the ends thereof. The one or more support elements are at least partly in said flow channel.

According to an embodiment, the neck element has at least one support element on a portion of the first coupling surfaces located at the blade part end of a sector in the neck element.

According to an embodiment, the neck element has one or more support elements each located on a portion between the first coupling surfaces and the second coupling surfaces.

In this embodiment there are no support elements on the portions of the coupling surfaces.

According to an embodiment, the neck element has one or more support elements each located on a portion of the first coupling surfaces. In this embodiment there are no support elements on the portion between the coupling surfaces.

According to an embodiment, the support element is an elongated rib. The longitudinal axis of the rib is parallel with the flow. The rib may have a relatively small wall thickness because the rib has length to provide sufficient support. A thin support element such as this causes as little disturbance as possible in the flow.

According to an embodiment, the neck part is provided with a plurality of ribs, which are arranged so that the longitudinal axes of the ribs are oriented towards the centre line of the flow channel in the flow direction, i.e. the ribs are directed towards the tapering second end in accordance with the flow channel.

According to an embodiment, the support element is a pin-like piece whose longitudinal direction is transverse to the flow channel in the neck part. The pin-like support element may be round or oval, for example, in cross-section. A cross-section comprising curved surfaces is more streamlined than an angulated shape and thus causes less disturbance in the flow in the flow channel. The pin-like support element may be a hollow tubular structure or the pin may be a solid piece.

According to an embodiment, the support element is a piece that is detachable from the neck part. The neck part or element may be provided with fastening means for fastening the support element. The support element may be fastened with screws, for example, or with similar fastening elements.

According to an element, the support element is a detachable piece and one or more fastening points that may be provided with support elements are formed in advance to the neck part. The inner side surfaces of the neck part or the neck element are provided with fastening surfaces that receive a support element to be placed between the side surfaces. The fastening surfaces may support the support element in one or more directions. The fastening of the support element so that it does not move may be secured by means of a screw, adhesive, or similar fixing means. Furthermore, the fastening surfaces and the support element may be shaped so that a form lock is established between them, whereby separate locking means are not necessarily needed at all.

According to an embodiment, the support element is an undetachable part of the neck part. The support element may be formed at the same time as the rest of the neck element structure. Hence the support element may be formed by moulding it at the same time as the basic structure of the neck element. On the other hand, the support element may be a separately formed piece that is fastened permanently in place in the neck part configuration by welding, for example.

According to an embodiment, the support element extends to the outer surface of at least one flank surface, i.e. the flank surface is provided with a hole through which the support element is arranged. The support element end extending to the outer surface may be upset or otherwise flattened. After the deformation, the support element head no longer fits through the hole, the support element being thus locked in place.

According to an embodiment, the neck element is of a plastic material. The neck element may comprise one or more plastic materials. In addition, the material to be used may comprise a fibre reinforcement.

According to an embodiment, the neck element is formed of a plastic material by casting. The neck element may be formed by injection moulding.

According to an embodiment, the neck element is of metal.

According to an embodiment, the support element is of the same material as the basic neck element structure.

According to an embodiment, the support element is of a different material than the basic neck element structure.

According to an embodiment, the neck element is of a plastic material and the support element is of a different plastic material as the basic neck element structure.

According to an embodiment, the support element is of a wear-resistant material.

According to an embodiment, the support element is of a tough plastic material, such as polyurethane.

According to an embodiment, the support element is of a ceramic material.

According to an embodiment, the neck element is formed of two halves and the neck element is provided with one or more support elements.

According to an embodiment, the joint surfaces of the neck element halves are on opposite side edges of the neck element.

According to an embodiment, the neck element is made of two halves and one or more support elements also participate in the fastening of the halves. There may be a fixing screw, for example, at the support element, by means of which the halves are fixed to one another.

According to an embodiment, a neck element or a sector already in use is provided with one or more support elements disclosed in the present application. This allows the capacity of the current sectors to be increased and their service life extended. Moreover, the arrangement is cost effective and ecological, because the basic structure of existing neck elements and sectors may be utilized until the end of their service life. As regards the basic structure of a sector or a loose neck, the support element of this embodiment is naturally a separately manufactured separate piece that is arranged between the inner flank surfaces in the neck part and fastened immovably in place. The support element may be a rib, for example, fastened in place with screws that are screwed through the neck part wall from the outer surface side of the neck part so that the screws reach the support element.

It should still be mentioned that the embodiments described in the above and their features can be combined whereby various combinations of properties may be formed.

BRIEF DESCRIPTION OF THE FIGURES

Some embodiments are explained in more detail in the accompanying drawings, in which.

For the sake of clarity, the figures show some embodiments in a simplified manner. In the figures, like reference numerals identify like elements.

DETAILED DESCRIPTION OF VARIOUS EMBODIMENTS

Figure 1:
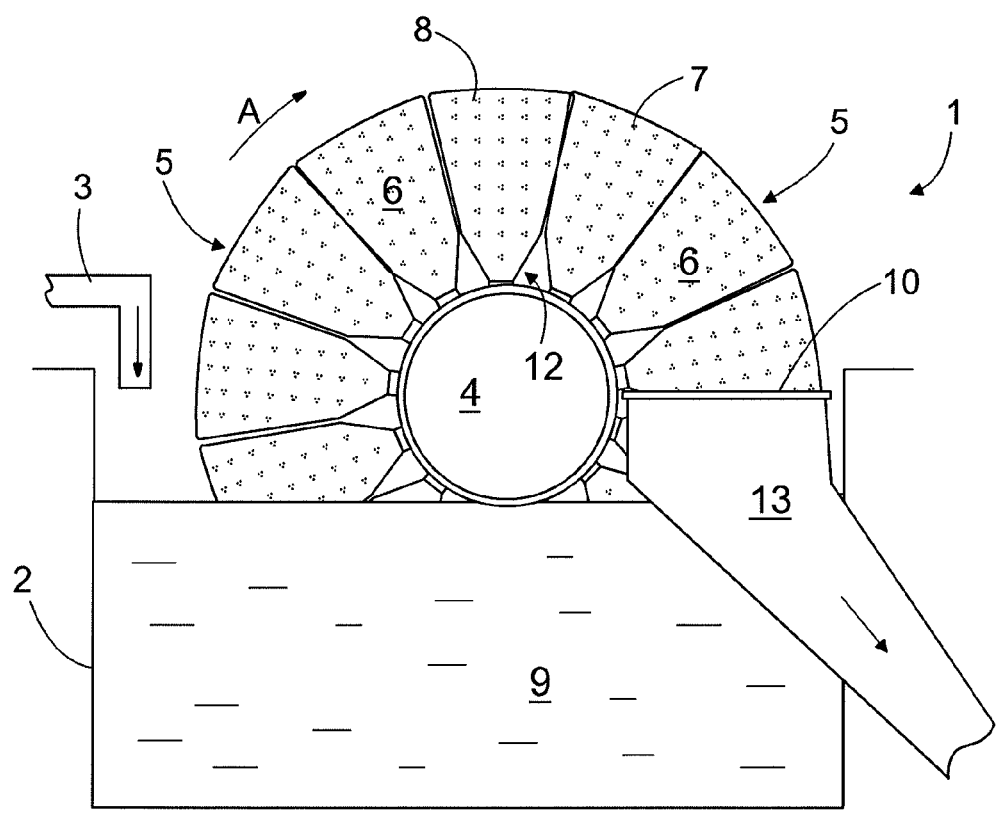
FIG. 1 is a schematic view of a disc filter.

FIG. 1 shows a disc filter 1, which comprises a basin 2 into which suspension consisting of solid matter and liquid is fed from a feed channel 3 for processing. Further, the disc filter 1 includes a body part 4 to be rotated about a horizontal axis. On the outer periphery of the body part 4, a plurality of substantially triangular sectors 5 are arranged side by side, whereby the sectors 5 form a relatively narrow discoidal structure around the body part 4. One body part 4 may comprise a plurality of such discoidal structures arranged at an axial distance from each other. The triangular flanks 6 in each sector 5 have holes 7. On top of the sectors 5, a filter bag 8 made of filter cloth suitable for solid-liquid filtering may be arranged, acting as the filtering layer. The body part 4 of the disc filter is rotated about its longitudinal axis A, whereby each sector 5 in turn sinks into a suspension 9 in the basin 2. Through the body part 4, it is possible to create an underpressure inside the sector 5 submerged in the suspension 9. This allows liquid to pass through the filter bag 8 and further inside the sector 5 through the holes 7 in the flank surface 6 of the sector. Inside the sector 5, the liquid, affected by the underpressure, flows to a neck part 12 of the sector and further out of the disc filter through the body part 4. Solid material, instead, will stay on the surface of the filter cloth 8, from where it may be removed by means of doctor blades 10 or pressure medium sprays to a discharge shaft 13 before a subsequent filtering cycle. Alternatively, the cloth is expanded by means of pressure in order to remove the solid material cake. It is additionally possible that a filter bag 8 formed of cloth is not arranged on the sector 5, but the flank surfaces of the sector 5 are provided with another filtering element.

Figures 2, 3:
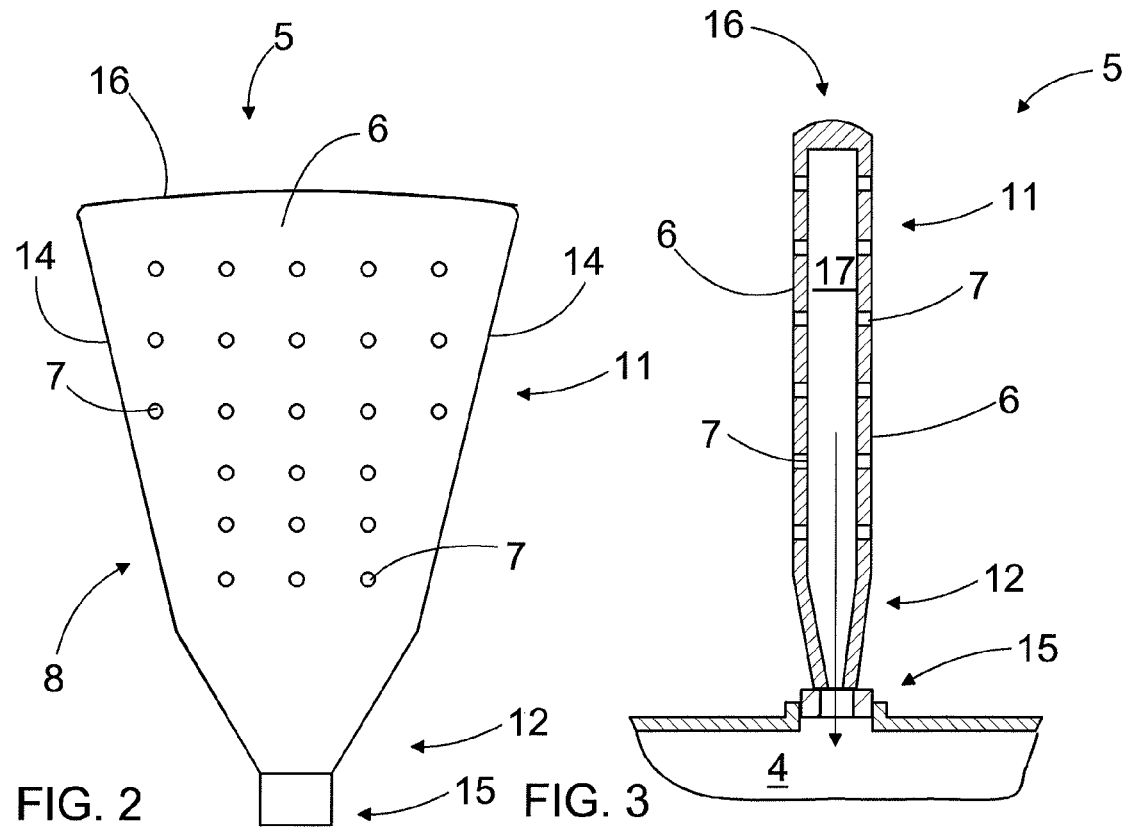
FIG. 2 is a schematic side view of a sector.
FIG. 3 is a schematic and sectioned view of a sector and its coupling to a disc filter.

FIGS. 2 and 3 illustrate the basic structure of the sector 5. The sector 5 comprises a blade part 11 and a neck part 12. The flanks 6 of the blade part 11 act as the filtering surfaces, which is why they are provided with holes 7. The neck part 12, on the contrary, has no holes, because no filtering takes place in it. The neck part 12 may begin from a point of the sector where the side surfaces 14 of the sector begin to taper towards a mouth 15. The outermost end of the sector 5 has an end edge 16. The sector 5 is hollow, in other words, it has a space 17 inside of it, which extends from the end edge 16 all the way to the mouth 15 and which is confined by flanks 6 and side edges 14.

Figure 4:
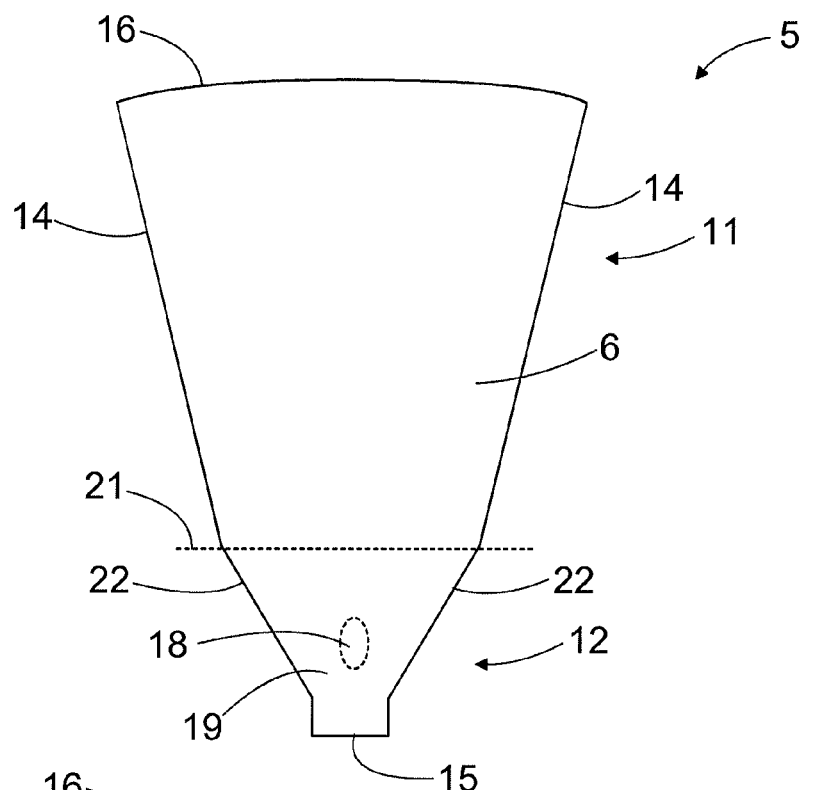
FIG. 4 is a schematic view of a sector having an inner support element on its neck part.

FIG. 4 is a strongly simplified view of a sector without openings in the blade part 11. The figure illustrates that the neck part 12 of the sector 5 may have one, two, three or more support elements 18 joining together the inner surfaces of the opposite flanks 19 of the neck part 12. The support element 18 may be pin-like protrusion having a cross-section whose outer surface may be round or oval, as shown in the figures. A broken line 21 in the figure illustrates the border line between the blade part 11 and the neck part 12. Further, the figure shows the side edges 22 and the mouth 15 of the neck part 12.

Figure 5:
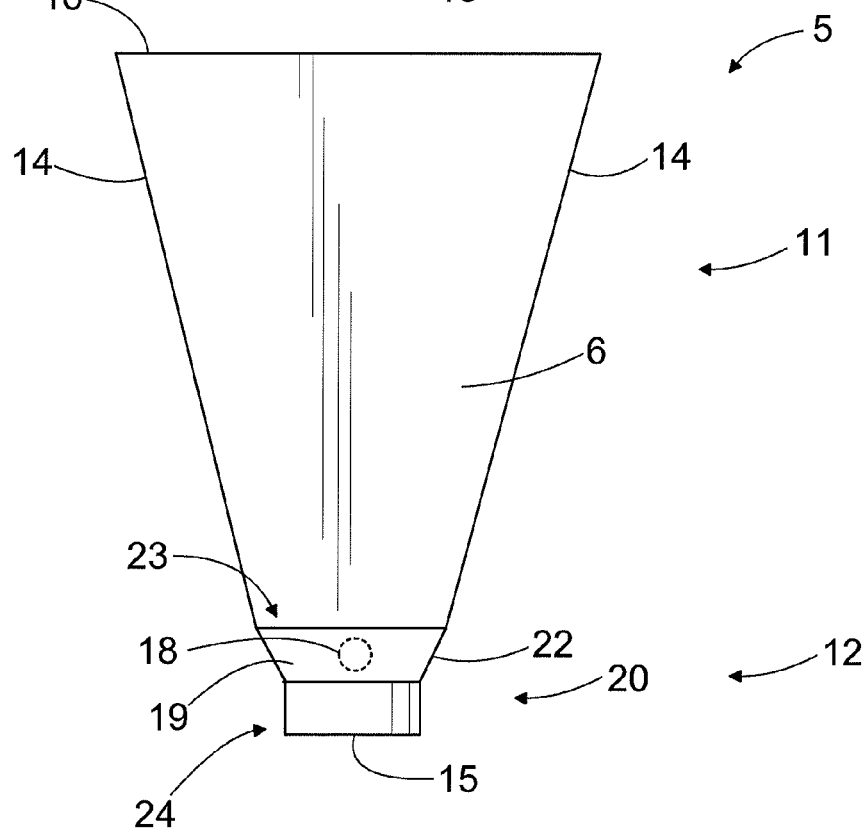
FIG. 5 is a schematic view of a sector that comprises a blade element and a neck element joined together, the neck element having a support element inside it.

FIG. 5 shows a sector 5, in which the neck part 12 is formed by a neck element 20 attached to a blade part 11. The neck element 20 and the blade part 11 are manufactured separately. A wider first end 23 of the neck element 20 is provided with first coupling surfaces to which the blade part 11 is coupled. A narrower end of the neck part 20, i.e. a second end 24 on the mouth 15 side, is provided with second coupling surfaces to be fixed to the disc filter. The neck element 20 may be further provided with one or more support elements 18 supporting the flanks 19 of the neck element 20. The surface area of the side edges 22 is smaller than that of the flanks 19 and therefore they are subjected to less strain and need not be supported on the inside.

Figure 6:
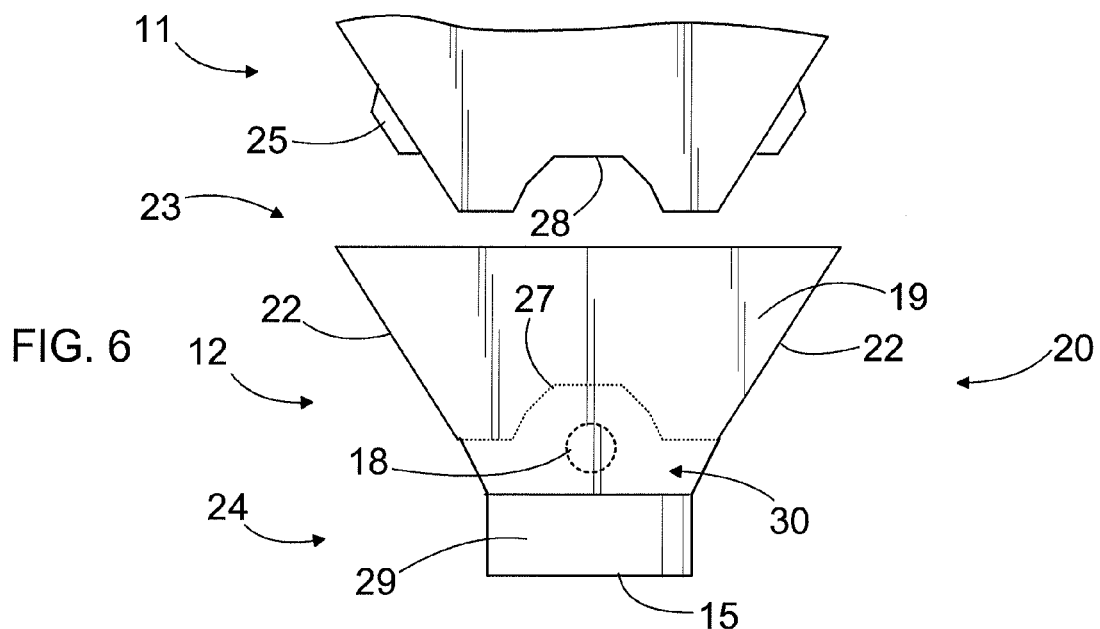
FIG. 6 is a schematic view of a joint between a blade element and neck element.

FIG. 6 shows a coupling between the blade part 11 and the neck element 20. A narrow end of the blade part 11 may be pushed inside the first end 23 of the neck element 20, whereby the blade part 11 and neck part 12 are partially within each other. The blade part 11 may have form locking means, such as locking projections 25, which may protrude into locking slots 26, which show in FIG. 8, in the neck element 20. The wider first end 23 of the neck element 20 has first coupling surfaces 27, which connect to coupling surfaces 28 that are at the end of the blade part 11. The coupling surfaces 28 of the blade part 11 may comprise shaped surfaces and the first coupling surfaces 27 may be shaped in a corresponding manner. At the other end 24 of the neck element 20, that is, at the narrow end at the side of the mouth 15, there are second coupling surfaces 29, by means of which the neck element 20 may be coupled to the disc filter. A portion between the first coupling surfaces 27 and the second coupling surfaces 29 is provided with a support element 18 that supports the flow channel 30 and prevents the opposite flanks 19 from moving in relation to one another.

Figure 7:
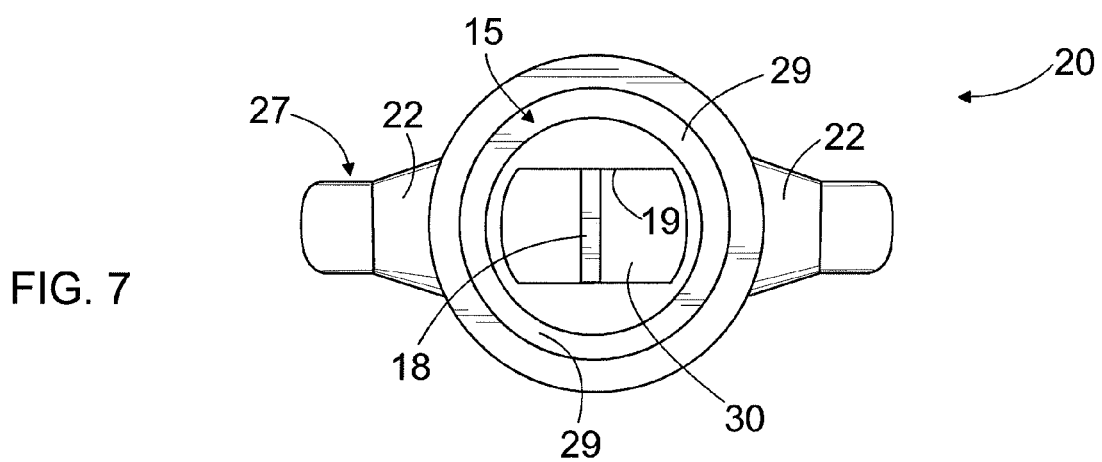
FIG. 7 is a schematic view of a neck element seen from the direction of a second joint end on the disc filter side.

FIG. 7 shows a neck element 20 as seen from the direction of the mouth 15. The flank surfaces 19 are supported by a support element 18 arranged inside the neck element 20. The support element 18 may be a rib whose longitudinal direction is parallel with the flow channel 30.

Figure 8:
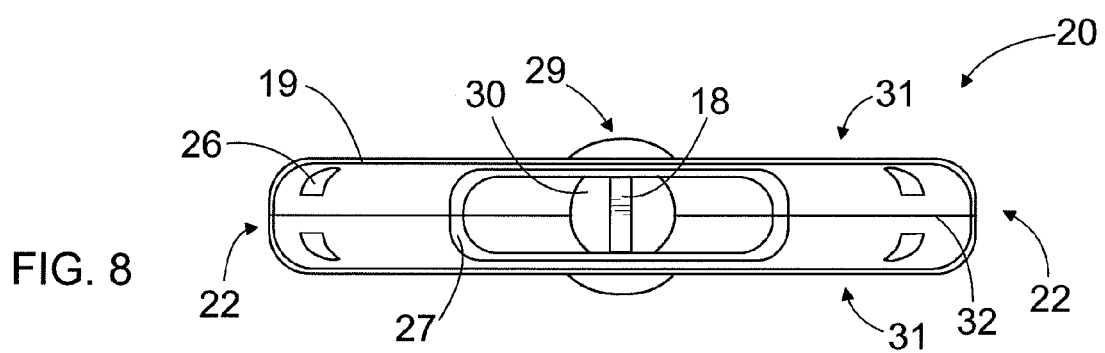
FIG. 8 is a schematic view of a neck element seen from the direction of a first joint end on the blade element side.

FIG. 8 shows a neck element 20 as seen from the direction of its wider end. The neck element 20 comprises an inner support element 18 that stiffens the structure. The figure further shows that the neck element 20 may be made of two halves 31 arranged against one another. The halves 31 comprise joint surfaces to be joined together, the surfaces forming division seams 32 to the side edges 22.

Figure 9:
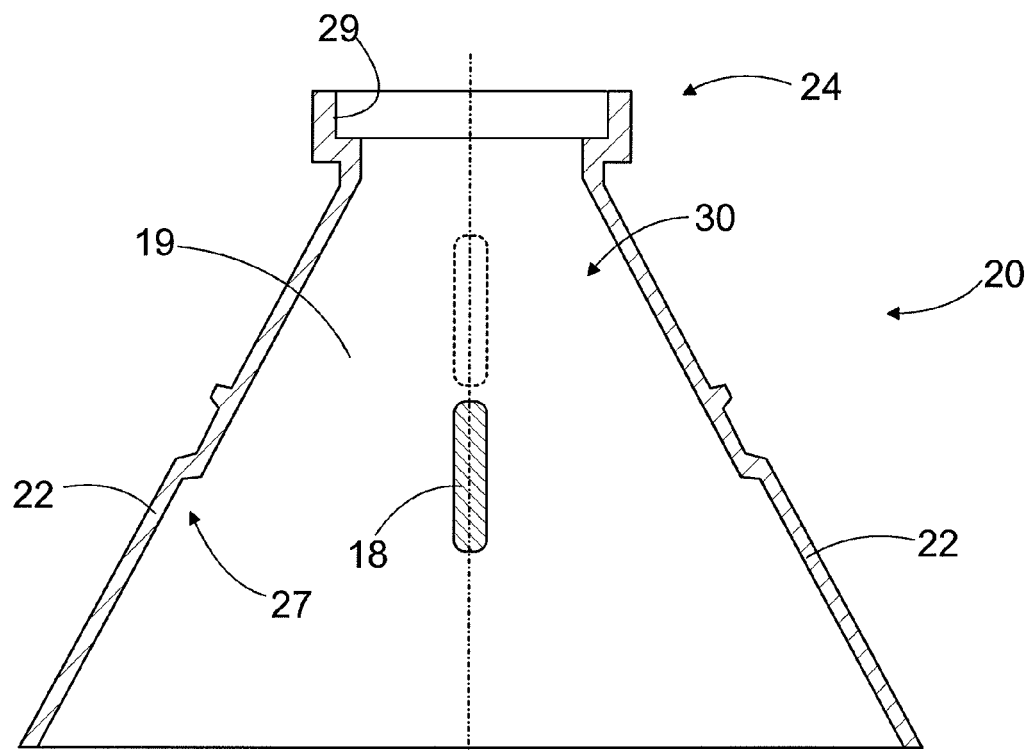
FIG. 9 is a schematic and sectioned view of a neck element provided with one rib-like support element.

The cross-section in FIG. 9 shows that the neck element 20 may comprise an elongated support element 18 that is partly on a portion of the first coupling surfaces 27. The support element 18 may be an elongated rib whose longitudinal axis is on the centre axis of the flow channel 30. An alternative location of the support element 18 is depicted by a broken line. This alternative support element 18 is on a portion between the coupling surfaces 27 and 29. The ends of the support element 18 may be rounded, which makes them streamlined.

Figure 10:
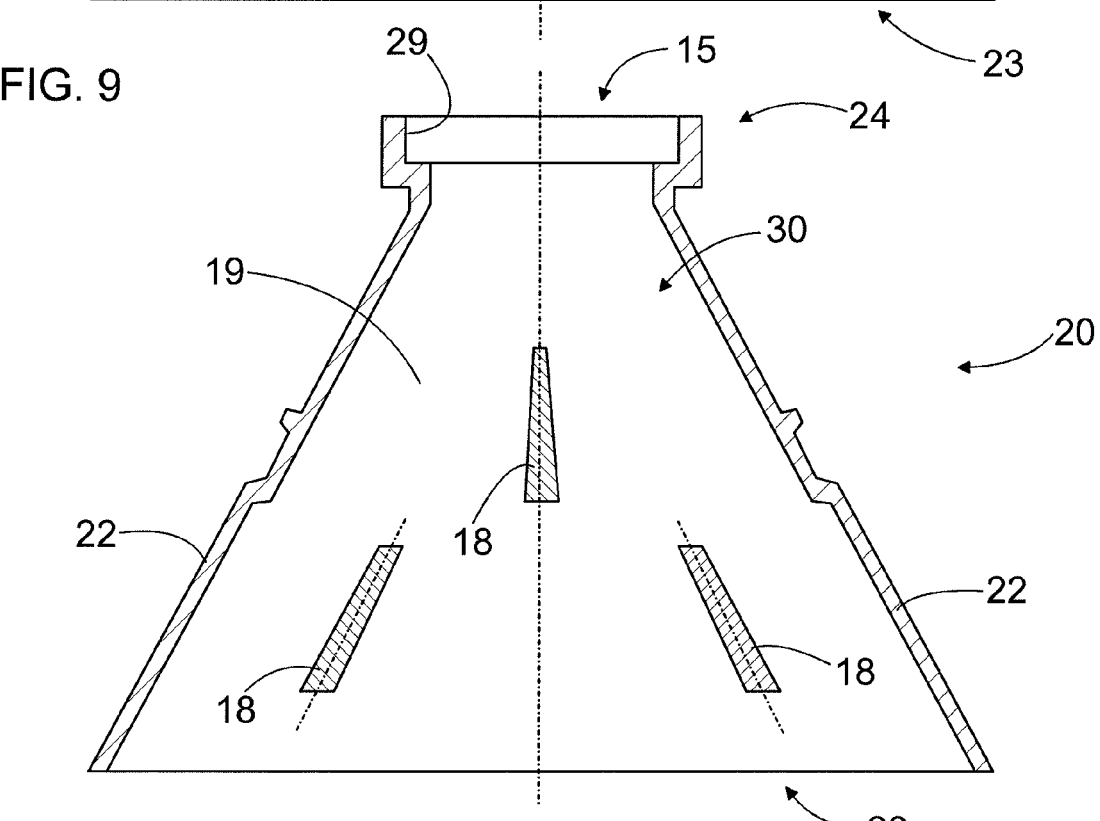
FIG. 10 is a schematic and sectioned view of a neck element provided with a plural number of rib-like support elements.

The neck element 20 in FIG. 10 is provided with a plural number of rib-like support elements 18. Three support elements 18 may be provided, and their positioning may follow the triangular shape of the flank 19, whereby good support may be established for the entire area of the flank 19. The elongated support elements 18 may be so aimed that their longitudinal axes point towards the mouth 15.

In some cases, features disclosed in this application may be used as such, regardless of other features. On the other hand, when necessary, features disclosed in this application may be combined in order to provide different combinations.

The drawings and the related description are only intended to illustrate the idea of the invention. Details of the invention may vary within the scope of the claims.

The invention claimed is:

1. A neck element of a disc filter sector, which is attachable to the disc filter sector to form its neck part, the neck element comprising:
   a body having a first end, a second end, two opposite side edges, and two opposite flanks, the two opposite flanks joining the two opposite side edges, said body having a flat shape so that the surface area of the flanks is larger than the surface area of the two opposite side edges, the first end and the second end being separated relative to one another by a distance defining a length of the body;
   first coupling surfaces at a first end of the body for coupling the neck element to a blade part of the disc filter sector;
   second coupling surfaces at a second end of the body for coupling the neck element to a disc filter;
   a flow channel inside the neck element;
   wherein:
      at least one support element is positioned inside the neck element and joining the flanks of the neck element;
      the at least one support element is positioned intermediate the first end and the second end of the body and has a length less than the length of the body;
      the at least one support element is an elongated rib; and
      one of the at least one support elements has a primary elongated rib axis aligned with a longitudinal axis of the neck element, said longitudinal axis extending through the first end and the second end of the body of the neck element.

2. A neck element as claimed in claim 1, wherein the at least one support element is at least partly on a portion between the first coupling surfaces and the second coupling surfaces.

3. A neck element as claimed in claim 1, wherein at least one support element is entirely on a portion of the first coupling surfaces.

4. A neck element as claimed in claim 1, wherein:
   the support element is a piece that is detachable from the neck element;
   and the neck element comprises fastening means for fastening the support element.

5. A neck element as claimed in claim 1, wherein the support element is integral with the neck element.

6. A neck element as claimed in claim 1, wherein:
   the neck element comprises two halves provided with joint surfaces; and
   the neck element is defined by an arrangement wherein the joint surfaces are positioned against one another, so as to join the two halves together.

7. A disc filter sector comprising:
   a blade part; and
   a neck part;
   wherein:
      the blade part comprises two opposite flanks that are triangular and provided with holes, the sides acting as filter surfaces in a sector;
      the blade part comprises two opposite side edges and an end edge at a first end of the blade part;
      inside the blade part there is a space defined by the flanks, the side edges and the end edge;
      a second end of the blade part connects to the neck part;
      the neck part comprises coupling means for coupling the sector to a disc filter;
      the neck part has a first end and a second end separated relative to one another by a distance defining a length of the neck part;
      the neck part comprises an inner flow channel for connecting the space inside the blade part to the disc filter;
      the neck part is formed by a separate neck element fastened to the blade part;
      the neck part comprises flanks that are parallel with the flanks of the blade part;
      at least one support element is positioned inside the neck part and joining the flanks of the neck part;
      the at least one elongated support element is positioned between the first end and the second end of the neck part and has a length less than the length of the neck part;
      the at least one support element is an elongated rib; and
      one of the at least one support elements has a primary elongated rib axis aligned with a longitudinal axis of the disc filter sector, said longitudinal axis extending from the blade part to the disc filter through the neck part.

8. A neck element of a disc filter sector, which is attachable to the disc filter sector to form its neck part, the neck element comprising:
   a body having a first end, a second end, two opposite side edges, and two opposite flanks, the two opposite flanks joining the two opposite side edges, said body having a flat shape so that the surface area of the flanks is larger than the surface area of the two opposite side edges, the first end and the second end being separated relative to one another by a distance defining a length of the body;
   first coupling surfaces at a first end of the body for coupling the neck element to a blade part of the disc filter sector;
   second coupling surfaces at a second end of the body for coupling the neck element to a disc filter;
   a flow channel inside the neck element;
   wherein:
      at least one support element is positioned inside the neck element and joining the flanks of the neck element;
      the at least one support element is positioned intermediate the first end and the second end of the body and has a length less than the length of the body;
      the at least one support element is an elongated rib; and
      the elongated rib has at least one elongate surface that generally faces at least one of the two opposite side edges of the body of the neck element.

9. A disc filter sector comprising:
   a blade part; and
   a neck part;
   wherein:
      the blade part comprises two opposite flanks that are triangular and provided with holes, the sides acting as filter surfaces in a sector;
      the blade part comprises two opposite side edges and an end edge at a first end of the blade part;
      inside the blade part there is a space defined by the flanks, the side edges and the end edge;
      a second end of the blade part connects to the neck part;

the neck part comprises coupling means for coupling the sector to a disc filter;

the neck part has a first end and a second end separated relative to one another by a distance defining a length of the neck part;

the neck part has two opposite side edges extending along the distance between the first and second ends of the neck part;

the neck part comprises an inner flow channel for connecting the space inside the blade part to the disc filter;

the neck part is formed by a separate neck element fastened to the blade part;

the neck part comprises flanks that are parallel with the flanks of the blade part;

at least one support element is positioned inside the neck part and joining the flanks of the neck part;

the at least one elongated support element is positioned between the first end and the second end of the neck part and has a length less than the length of the neck part;

the at least one support element is an elongated rib; and the elongated rib has at least one elongate surface that generally faces at least one of the two opposite side edges of the neck part.

* * * * *